US012482624B2

(12) United States Patent
Yoshikawa

(10) Patent No.: US 12,482,624 B2
(45) Date of Patent: Nov. 25, 2025

(54) CONTACT MATERIAL FOR THERMAL FUSE AND THERMOSENSITIVE PELLET-TYPE THERMAL FUSE USING THE SAME

(71) Applicant: SCHOTT Japan Corporation, Koka (JP)

(72) Inventor: Tokihiro Yoshikawa, Koka (JP)

(73) Assignee: SCHOTT Japan Corporation, Koka (JP)

( * ) Notice: Subject to any disclaimer, the term of this patent is extended or adjusted under 35 U.S.C. 154(b) by 189 days.

(21) Appl. No.: 18/083,348

(22) Filed: Dec. 16, 2022

(65) Prior Publication Data

US 2023/0197393 A1 Jun. 22, 2023

(30) Foreign Application Priority Data

Dec. 20, 2021 (JP) ................................ 2021-206406

(51) Int. Cl.
*H01H 37/76* (2006.01)
*H01H 85/06* (2006.01)
(Continued)

(52) U.S. Cl.
CPC .......... *H01H 85/06* (2013.01); *H01H 37/764* (2013.01); *H01H 85/08* (2013.01);
(Continued)

(58) Field of Classification Search
CPC ...... H01H 85/06; H01H 85/08; H01H 85/143; H01H 85/175; H01H 2235/03; H01H 37/764–766
See application file for complete search history.

(56) References Cited

U.S. PATENT DOCUMENTS 4,127,839 A * 11/1978 Ito ........................ H01H 37/764 337/408
11,295,915 B2 * 4/2022 Hierl .................... H01H 37/761
(Continued)

FOREIGN PATENT DOCUMENTS

JP 2014099249 A 5/2014

*Primary Examiner* — Jacob R Crum
(74) *Attorney, Agent, or Firm* — Dennemeyer & Associates LLC

(57) ABSTRACT

Problem
To maintain a low internal resistance value and adjust spring characteristics by using a movable contact made of a multilayered material.
Means for Solving Problem
A thermosensitive pellet-type thermal fuse includes, in an interior of a cylindrical case having electrical conductivity, a thermosensitive pellet that melts or softens at a temperature, a strong compression spring configured to press the thermosensitive pellet, an insulating cover closing the cylindrical case, a weak compression spring abutting against the insulating cover, a first lead extending through the insulating cover and including an inner end as a fixed contact, a movable contact electrically connecting to the first lead and the cylindrical case, a sealing resin provided surrounding a portion of the first lead and covering an outer end portion of the insulating cover, and sealing an open end portion of the cylindrical case, and a second lead disposed at one end of the cylindrical case. The movable contact includes a conductive base material and a conductive member covering a predetermined surface of the conductive base material. The conductive member is provided to contact portions with the fixed contact and an inner wall surface of the cylindrical case, and is made of a material having a Young's modulus and a rigidity different from those of the conductive base material.

27 Claims, 7 Drawing Sheets

(51) Int. Cl.
*H01H 85/08* (2006.01)
*H01H 85/143* (2006.01)
*H01H 85/175* (2006.01)

(52) U.S. Cl.
CPC ......... *H01H 85/143* (2013.01); *H01H 85/175* (2013.01); *H01H 2235/03* (2013.01)

(56) References Cited

U.S. PATENT DOCUMENTS

| | | | | |
|---|---|---|---|---|
| 2004/0239457 | A1* | 12/2004 | Mori | H01H 1/04<br>335/83 |
| 2009/0091417 | A1* | 4/2009 | Yoshikawa | H01H 37/765<br>337/298 |
| 2014/0306794 | A1* | 10/2014 | Yoshikawa | H01H 37/765<br>337/148 |
| 2015/0054613 | A1* | 2/2015 | Sakaguchi | C22C 5/08<br>337/111 |

* cited by examiner

CONTACT MATERIAL FOR THERMAL FUSE AND THERMOSENSITIVE PELLET-TYPE THERMAL FUSE USING THE SAME

CROSS-REFERENCE TO RELATED APPLICATIONS

This is a Paris Convention filing which claims priority to Japanese application 2021-206406 filed Dec. 20, 2021, each of which is hereby incorporated by reference in its entirety.

TECHNICAL FIELD

The present invention relates to a contact material composed of a composite material having a multilayered structure and a thermosensitive pellet-type thermal fuse using the same.

BACKGROUND ART

A thermal fuse has been used to protect household or industrial electronic and electrical devices from damage caused by excessive heat. A thermal fuse is used in various household electrical appliances, portable devices, communication devices, office equipment, in-vehicle devices, AC adapters, chargers, motors, batteries, and other electronic components as a protection component that accurately detects the temperature of the device and, in the event of abnormal overheating, promptly cuts off circuitry. In general, a thermal fuse has a wide range of nominal current ratings from roughly 0.5 A to 15 A. However, for high currents of 6 A or greater, in particular, a thermosensitive pellet-type thermal fuse that includes a contact and is configured to separate the contact upon detection of an abnormal temperature is suitably utilized. Thermosensitive pellet-type thermal fuses are available in a variety of forms in terms of details. For example, a thermosensitive pellet-type thermal fuse described in Patent Document 1 includes a Ag-plated metal case, a pair of Ag-plated lead wires, an insulating material, two compression springs (one weak, one strong), a sliding contact, and a thermosensitive material as main constituent elements, and the sliding contact is movable while in contact with an inner surface of the Ag-plated metal case. The weak compression spring is provided between the sliding contact and the insulating material, and the strong compression spring is provided between the sliding contact and the thermosensitive material. Both compression springs are normally in a compressed state, and the strong compression spring is stronger than the weak compression spring. Therefore, the sliding contact is pressed toward the insulating material and is in a conductive state. Accordingly, when a lead wire is connected to a wiring line of an electronic device or the like, current flows from the lead wire through the sliding contact to the metal case and then to another lead wire. An organic agent, a thermoplastic resin, or the like can be used for the thermosensitive material. When a predetermined operating temperature is reached, the thermosensitive material melts or softens and deforms under a load from the compression springs. Therefore, when an electronic device or the like to which the thermal fuse is connected overheats and the predetermined operating temperature is reached, the thermosensitive material deforms, the corresponding compression spring is unloaded, the compressed state of the other compression spring is released in response to the extension of the compression spring, and the compression spring extends, causing the sliding contact to move while in contact with the inner surface of the metal case, thereby cutting off the electrical conduction. By connecting a thermosensitive pellet-type thermal fuse having such a function to a wiring line of an electronic device or the like, it is possible to prevent damage to a device body, a fire, or the like caused by abnormal overheating of the device.

As a sliding contact used in the thermosensitive pellet-type thermal fuse, a sliding contact obtained by rolling a metal material into a thin plate shape and forming the plate into a recessed star shape by press-forming the plate is generally used. As the sliding contact used in the thermosensitive pellet-type thermal fuse in the related art, a sliding contact obtained by dispersively generating oxide particles, such as those of Cu oxide, in a Ag base material on a surface layer portion of the contact material by internal oxidation of an internally oxidizable Ag alloy containing Cu or the like in a pressurized oxidation furnace, as in Patent Document 1, has been used due to the necessity of prevention of welding of a contact caused by arcing during a separation operation. Furthermore, in Patent Document 2, a sliding contact obtained by plating a surface of a Cu base material with a single layer of ultra-thin Ag is known.

CITATION LIST

Patent Literature

Patent Document 1: WO 2003/009323 A1
Patent Document 2: JP 3161636 U

SUMMARY OF INVENTION

Technical Problem

The sliding contact that utilizes an internally oxidizable Ag alloy material in the related art is of a contact material that prevents the contact from being welded or adhered by selectively oxidizing a noble metal of an alloy material of a Ag base material and the noble metal by an internal oxidation method, and dispersing and encapsulating oxide particles in the surface layer portion. On the other hand, the surface is dominated by soft Ag, and thus the material is prone to the occurrence of contact welding and adherence. Further, with the use of Ag, the contact material can be cited as relatively expensive. A sliding contact requires a springiness for allowing the electrical contact with the metal case to be maintained and a movability for allowing smooth sliding without the contact being welded or adhered. The idea described in Patent Document 2 is a low-cost contact material proposed to improve this problem. However, in a case in which the contact portion is formed simply by a thin film of Ag plating material on a Cu base material as described therein, the Ag plating film thickness is too thin and may cause the Ag plating film to be readily damaged due to arcing during the separation operation or the like, exposing the Cu material surface and resulting in contact adhesion. Further, a drawback also exists that the Ag layer on the surface may diffuse and disappear into the Cu base material over time when exposed to a thermal environment for an extended period, causing an increase in a fuse resistance value and the occurrence of welding during contact separation. Furthermore, an annealing effect may reduce the spring force that presses the contact portion of the sliding contact against the sliding surface or the like, causing the fuse resistance value to increase. Note that being adhered means that the contact portions, due to prolonged exposure to a thermal environment, are pressed against each other, become stuck or adhered, and no longer move, and being welded means that the contact portions are welded together by an arc produced when the contact portions separate during the separation operation, and no longer move.

An object of the present invention is to provide a contact material for a thermal fuse that uses an inexpensive base material with minimal use of precious metals such as a Ag base material, can adjust a springiness for maintaining electrical contact with a metal case, and can prevent welding and adhesion to a lead while suppressing an increase in a contact resistance value, and a thermosensitive pellet-type thermal fuse that utilizes the contact material.

SUMMARY OF INVENTION

According to the present invention, provided is a contact material for a thermal fuse, the contact material being a movable contact of a thermosensitive pellet-type thermal fuse. The contact material includes a conductive base material and a conductive member provided covering a predetermined area of a surface of the conductive base material. The conductive member is provided to at least contact portions with a fixed contact and a cylindrical case of the thermal fuse, and is made of a material having a Young's modulus and a rigidity different from a Young's modulus and a rigidity of the conductive base material. This contact material can be applied to a sliding contact of a thermosensitive pellet-type thermal fuse. For example, the contact material can be utilized in a star-shaped movable contact of a thermal fuse. The conductive member may be partially provided in an overlay extending the conductive member over, or an inlay fitting the conductive member into, at least the contact portion on one side of the conductive base material with the fixed contact or the cylindrical case. By compounding the conductive member with the conductive base material by the overlay or the inlay, it is possible to combine materials having different Young's moduli, and change a thickness of the contact material itself as needed. This makes it easy to adjust spring characteristics of the contact material to a desired range. Note that the overlaid or inlaid surface may not necessarily be formed flat so as to be flush with the conductive base material surface, and may be configured to be uneven by the overlay portion or the inlay portion. However, the movable contact according to the present invention may be of any shape and is not limited to the star-shape exemplified as long as the movable contact can maintain a springiness for allowing electrical contact with the metal case to be maintained and a movability for allowing smooth sliding without being welded or adhered at a predetermined voltage/current rating.

According to another aspect of the present invention, as illustrated in FIG. 4, a thermosensitive pellet-type thermal fuse in which an abutment surface between a fixed contact provided on a lead inner end surface and a movable contact is a contact separation surface includes, in an interior of a cylindrical case 41 having favorable electrical conductivity and favorable thermal conductivity, a thermosensitive pellet 42 that melts or softens at a specific temperature, a strong compression spring 43 configured to press the thermosensitive pellet 42, an insulating cover 44 closing an opening of the cylindrical case 41, a weak compression spring 45 abutting against the insulating cover 44, a first lead 46 extending through the insulating cover 44 and including an inner end as a fixed contact 400, a movable contact 47 electrically connecting to the first lead 46 and the cylindrical case 41, a sealing resin 48 provided surrounding a portion of the first lead 46 and covering an outer end portion of the insulating cover 44, and sealing an open end portion of the cylindrical case 41, and a second lead 49 disposed at one end of the cylindrical case 41. As illustrated in FIG. 2, the movable contact 47 includes a conductive base material 21 and a conductive member 22 covering a predetermined surface of the conductive base material 21, and the conductive member 22 is provided to at least contact portions with the fixed contact 400 and an inner wall surface of the cylindrical case 41, and is made of a material having a Young's modulus and a rigidity different from a Young's modulus and a rigidity of the conductive base material 21. The conductive member of the movable contact may be provided by an overlay extending the conductive member over a planar surface of the conductive base material at the contact portion with the fixed contact on one side of the conductive base material and the contact portion with the inner wall surface of the cylindrical case, or by an inlay fitting the conductive member into a cavity provided in the conductive base material. The movable contact is constituted by the conductive base material and the conductive member, making it possible to change an elasticity by location by the combination of materials having different Young's moduli, or making it possible to change a thickness of each of the materials described above, as necessary. Accordingly, in the movable contact of the thermosensitive pellet-type thermal fuse of the present invention, the spring characteristics can be easily adjusted to a desired range. The overlaid or inlaid surface may not necessarily be formed flat so as to be flush with the conductive base material surface, and the surface of the movable contact may be configured to be uneven by the overlay portion or the inlay portion. As a result, a thickness of a desired area of the movable contact can be changed, making it possible to adjust a spring force of the movable contact to a desired value. However, the movable contact according to the present invention may be of any shape and is not limited to the recessed star-shape exemplified in FIG. 2 as long as the movable contact can maintain a springiness for allowing electrical contact with the metal case to be maintained and a movability for allowing smooth sliding without being welded or adhered at a predetermined voltage/current rating.

As illustrated in FIG. 6, in the thermosensitive pellet-type thermal fuse, a first lead 66, a cylindrical case 61, a movable contact 67, and a second lead 69 are held in a conductive state in (a) before operation. Then, when the temperature of the installation location reaches the operating temperature of the thermosensitive pellet-type thermal fuse due to abnormal electrical conduction, such as a short circuit in a wiring line, for example, a thermosensitive pellet 62 melts and an urging force pressing and bringing the movable contact 67 into contact with a fixed contact 600 at an inner end portion of the first lead 66 is released, separating the movable contact 67 from the fixed contact 600 of the first lead and cutting off the electrical conduction between the first lead 66 and the second lead 69, as illustrated in (b) after operation. The thermosensitive pellet-type thermal fuse transitions from (a) before operation to (b) after operation in FIG. 6, thereby stopping the supply and distribution of power to the electrical device and preventing overheating damage in electrical equipment or a fire accident.

Advantageous Effects of Invention

According to an embodiment of the present invention, by using a movable contact obtained by applying a contact material made of a multilayered material as a movable contact of a thermosensitive pellet-type thermal fuse, it is possible to expect a reduction in welding and adherence to a lead by maintaining a low internal resistance value of the thermosensitive pellet-type thermal fuse and adjusting spring characteristics while using a less expensive conductive base material. Further, it is possible to expect a reduction in the usage of precious metal material.

DESCRIPTION OF EMBODIMENTS

Figure 1:
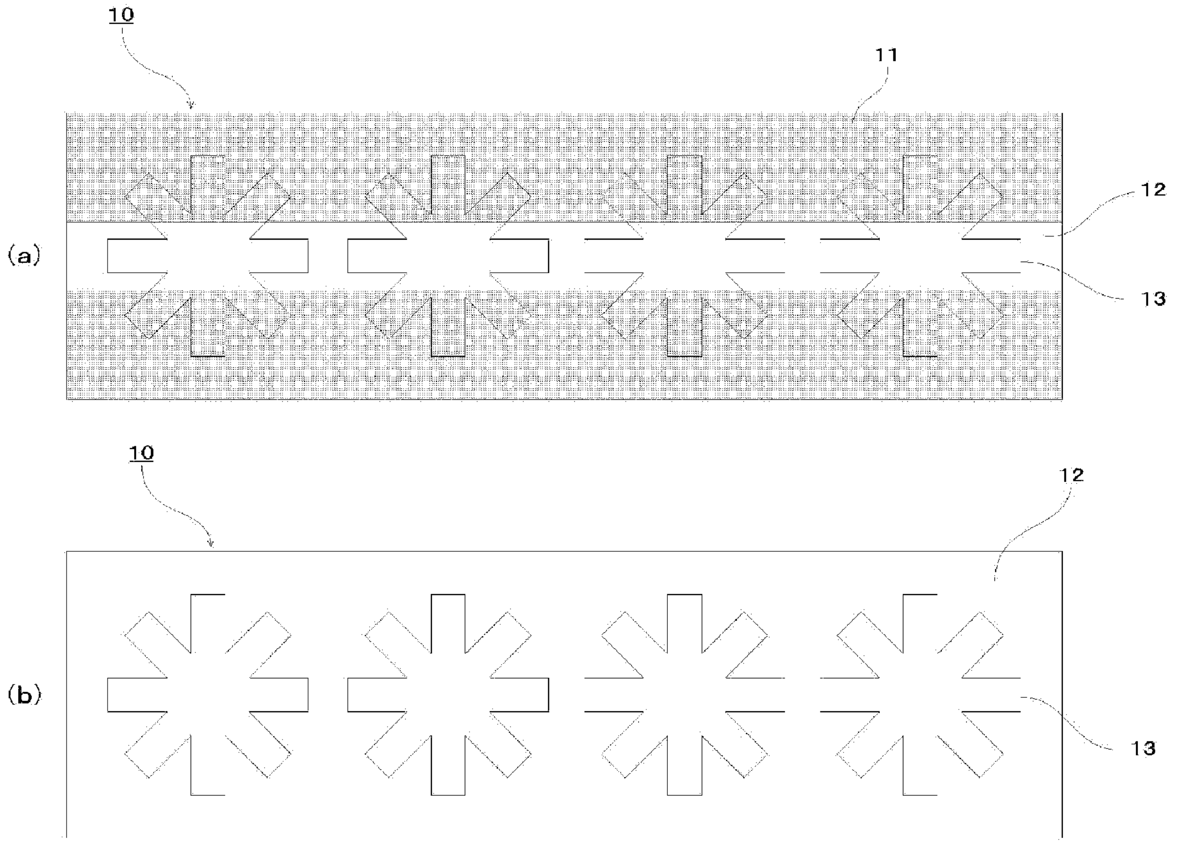
FIG. 1 is a diagram illustrating a portion of a contact material 10 according to the present invention, FIG. 1(*a*) being a diagram illustrating an example of a surface on a side of movable contacts that includes a contact portion with a fixed contact, and punching locations of the movable contacts, and FIG. 1(*b*) being a diagram illustrating an example of a surface of a side of the movable contacts that includes a contact portion with a cylindrical case, and punching locations of the movable contacts.
Figure 2:
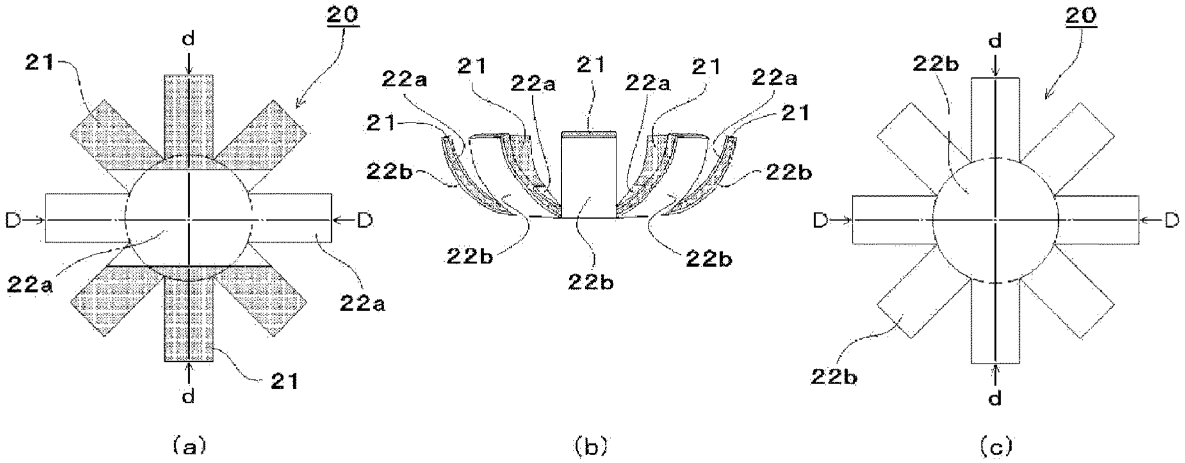
FIG. 2 illustrates an example of a shape of a movable contact 20 according to the present invention, FIG. 2(*a*) being a plan view, FIG. 2(*b*) being a side view, and FIG. 2(*c*) being a bottom view.
Figure 3:
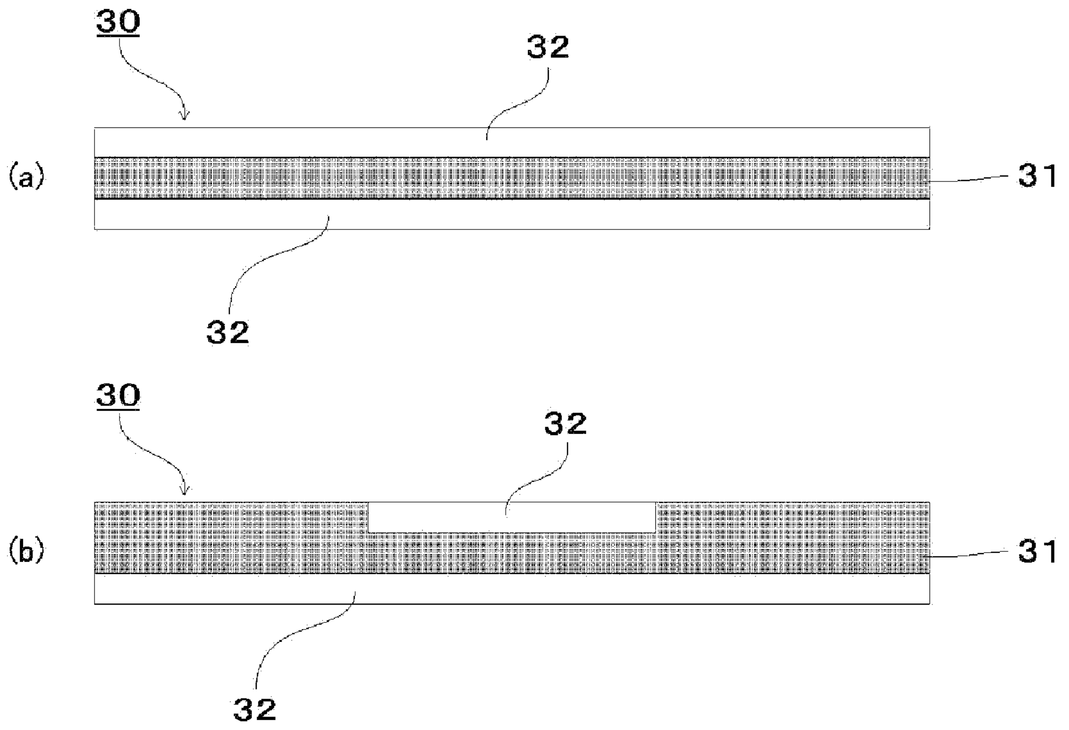
FIG. 3 illustrates an example of a cross-sectional view of the movable contact according to the present invention, FIG. 3(*a*) being a view obtained by leveling, into a flat plate, a cross-section taken along a line D-D in FIG. 2(*a*), and FIG. 3(*b*) being a view obtained by leveling, into a flat plate, a cross-section taken along a line d-d in FIG. 2(*a*).

An example of a contact material 10 for a thermal fuse according to the present invention is illustrated in FIG. 1. The contact material 10 for a thermal fuse includes a conductive base material 11 and a conductive member 12 provided in a necessary areas of the conductive base material 11. The conductive member 12 is provided only to desired portions of a thermosensitive pellet-type thermal fuse, including contact portions with a fixed contact and a cylindrical case, and is made of a material having a Young's modulus and a rigidity different from those of the conductive base material. FIG. 1 is a diagram illustrating an example of a portion of the contact material prior to punching the movable contacts, with a star-shaped portion 13 in FIG. 1 indicating a punching location of a movable contact. The contact material 10 for a thermal fuse is processed into a predetermined shape, and can be applied to a movable contact 47 of a thermosensitive pellet-type thermal fuse 40 illustrated in FIG. 4. For example, the contact material 10 for a thermal fuse according to the present invention is processed into the movable contact 20 or 30 such as illustrated in FIG. 2 or FIG. 3 by press-punching and used. The contact material 10 for a thermal fuse includes the conductive base material 11 that has spring force, compresses readily, has favorable compression returnability, and has a high Young's modulus and a high rigidity, and the conductive member 12 provided in necessary areas of the conductive base material 11 and having a Young's modulus and a rigidity lower than those of the conductive base material 11. The conductive member 12 may be provided only to desired portions of the thermosensitive pellet-type thermal fuse, including the contact portions with the fixed contact and the cylindrical case. The conductive member 12 disposed on side (a) of FIG. 1 is a surface including the contact portion with the fixed contact of the thermal fuse, and is an inner side surface 22*a* of a recessed surface of the movable contact 20 in FIG. 2. On the other hand, the conductive member 12 disposed on side (b) of FIG. 1 is a surface including the contact portion with the cylindrical case of the thermal fuse, and is an outer side surface 22*b* of the recessed surface of the movable contact 20 in FIG. 2. The contact material 10 for a thermal fuse is formed into the movable contact 20 having a star-shape including extending portions of five points, for example, the extending portions are further bent in one direction in a bowl shape or dish shape, and the fixed contact of the thermal fuse is abutted against a bottom surface of the inner side surface 22*a* of the bowl shape or the dish shape of the extending portions so that the outer side surface 22*b* of the extending portions comes into contact with a cylindrical case inner wall of the thermal fuse and can slide against the case inner wall. The conductive member 12 is provided in an overlay extending the conductive member 12 over, or in an inlay fitting the conductive member 12 into, at least the contact portion with the fixed contact of the conductive base material 11 and the contact portion with the cylindrical case. The movable contact of the present invention, by compounding the conductive member with the conductive base material, makes it possible to combine materials having different Young's moduli and change a thickness of the contact material itself, as necessary. This makes it easy to adjust the spring characteristics of the contact material to a desired range, suppressing a decrease in the spring force of the movable contact material caused by annealing. Note that the overlaid or inlaid surface may not necessarily be formed flush (flat) with the conductive base material surface, and may be configured to be uneven by the overlay portion or the inlay portion. The movable contact 20 is preferably imparted with a recessed star shape as illustrated in FIG. 2. As long as the movable contact 20 can come into contact with and separate from the fixed contact of the desired thermosensitive pellet-type thermal fuse and come into contact with the cylindrical case inner wall and slide against the case inner wall, the movable contact 20 may have any shape and is not limited to the star shape. For example, a star shape with an increased or decreased number of points or a circular dish shape are also possible. Further, the movable contact 20 may, at an interface between a conductive base material 51 and a conductive member 52, be modified to a movable contact 50 provided with a metal interface layer 53 composed of any one of a Ag plating layer, a Ni plating layer, a Ni—P alloy plating layer, and an alloy plating layer with Ni as a main component for prevention of interdiffusion and improvement of adhesion of both materials. This delays or prevents diffusion of the conductive member 12 into the conductive base material 11 in a thermal environment.

Means for changing the Young's modulus and the rigidity of the contact material 10 include a method of creating a difference in thickness between the conductive base material 11 and the conductive member 12, a method of creating a difference by changing a degree of work hardening between the materials of the conductive base material 11 and the conductive member 12 by rolling/forging or the like, or by work hardening one of the conductive base material 11 and the conductive member 12, and a method of creating a difference by changing the degree of heat treatment of quenching/annealing or the like between the materials of the conductive base material 11 and conductive member 12 or by applying any of the heat treatments described above to one of the materials of the conductive base material 11 and the conductive member 12. Further, in the case of the conductive member 12 made of an alloy, the Young's modulus and the rigidity of the contact material 10 may be adjusted by increasing or decreasing the content of a metal component or a metal oxide of the constituent alloy. For example, in the case of a Ag alloy, the Young's modulus and the rigidity of the contact material 10 may be adjusted by increasing or decreasing the component amount of CuO, Ni, $SnO_2$, $In_2O_3$, or the like.

Figure 4:
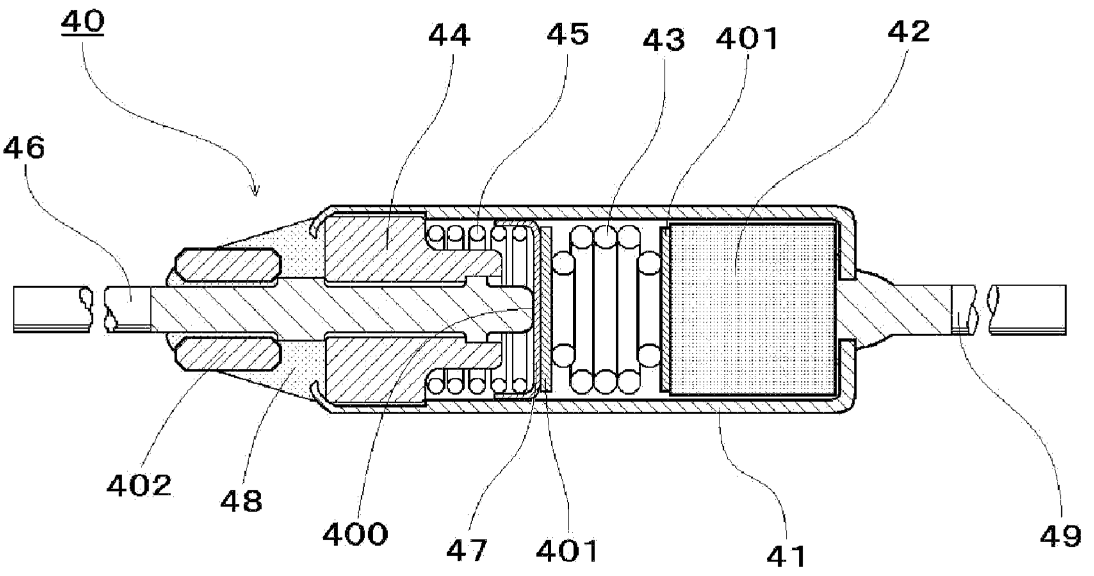
FIG. 4 is a cross-sectional view illustrating a thermosensitive pellet-type thermal fuse 40 suitable for applying the movable contact 20 according to the present invention.

The thermosensitive pellet-type thermal fuse 40 according to the present invention is a thermosensitive pellet-type thermal fuse that utilizes the contact material 10 for a thermal fuse or the movable contact 20. The thermosensitive pellet-type thermal fuse 40, as illustrated in FIG. 4, includes, in an interior of a cylindrical case 41 having favorable electrical conductivity and favorable thermal conductivity, a thermosensitive pellet 42 that melts or softens at a specific temperature, a strong compression spring 43 configured to press the thermosensitive pellet 42, an insulating cover 44 closing an opening of the cylindrical case 41, a weak compression spring 45 abutting against the insulating cover 44, a first lead 46 extending through the insulating cover 44 and including an inner end as a fixed contact 400, the movable contact 47 electrically connecting to the first lead 46 and the cylindrical case 41, a sealing resin 48 provided surrounding a portion of the first lead 46 and covering an outer end portion of the insulating cover 44, and sealing an open end portion of the cylindrical case 41, and a second lead 49 disposed at one end of the cylindrical case 41. The movable contact 47 includes the conductive base material and the conductive member covering a predetermined surface of the conductive base material, and the conductive member is provided only to desired portions including the contact portions with the fixed contact 400 and the cylindrical case 41, and is made of a material having a Young's modulus and a rigidity different from those of the conductive base material. The conductive member of the movable contact may be provided to the contact portions of the conductive base material with the fixed contact and the cylindrical case by an overlay extending the conductive member over a planar surface of the conductive base material or an inlay fitting the conductive member into a cavity provided in the conductive base material. The movable contact is constituted by the conductive base material and the conductive member, making it possible to combine materials having different Young's moduli, and change the thickness of the contact material itself, as necessary. Accordingly, the movable contact of the thermosensitive pellet-type thermal fuse of the present invention facilitates adjustment of the spring characteristics to a desired range and suppresses a reduction in the spring force of the movable contact material caused by annealing. The overlaid or inlaid surface may not necessarily be formed flush (flat) with the conductive base material surface, and may be configured to be uneven by the overlay portion or the inlay portion. For example, although not specifically illustrated in FIG. 4, the movable contact 47 is provided with an overlay layer or an inlay layer composed of a conductive base material 21 having springiness that compresses readily, has favorable compression returnability, and has a high Young's modulus and a high rigidity, and the conductive members 22*a*, 22*b* having Young's moduli and rigidities lower than those of the conductive base material 21 in the desired portion 22*a* including the contact portion with the fixed contact 400 and in the contact portion 22*b* with the cylindrical case 41, as described in FIG. 2. The thermosensitive pellet-type thermal fuse 40 may further be provided with a pressing plate 401 on both ends of the strong compression spring 43 as necessary, and, as necessary, the first lead 46 may be inserted into an insulating porcelain tube 402, and the insulating porcelain tube 402 may be adhered by the sealing resin 48.

EXAMPLES

The contact material 10 for a thermal fuse of FIG. 1 is illustrated as example 1 of the present invention. The contact material 10 for a thermal fuse is constituted by the conductive base material 11 made of a phosphor bronze selected from Cu or a Cu alloy that has spring force, compresses readily, has favorable compression returnability, and has a high Young's modulus and a high rigidity (Cu-8Sn-0.2P, Young's modulus: 110 [E/GPa], shear modulus: 43 [G/GPa], electrical resistance: 2.3 [μΩ·cm]) and the conductive member 12 made of Ag or a Ag alloy having a Young's modulus and a rigidity lower than those of the conductive base material 11 and an electrical resistance value lower than that of the conductive base material 11 in desired portions of the conductive base material 11 including the contact portions with the fixed contact and the cylindrical case (Young's modulus: 82.7 [E/GPa], shear modulus: 30.3 [G/GPa], electrical resistance: 1.47 [μΩ·cm]). The conductive member 12 made of a Ag alloy is selected from Ag alloys including any one of oxide metal alloys such as AgCuO, $AgSnO_2$, and $AgSnO_2$—$In_2O_3$ and Ag alloys such as AgNi. The conductive member 12, while not particularly limited to this, may have an electrical resistance value lower than that of the conductive base material 11. The contact material 10 for a thermal fuse is molded into the movable contact 20 or 30 of the thermosensitive pellet-type thermal fuse illustrated in FIG. 2 or FIG. 3, and utilized in the thermosensitive pellet-type thermal fuse. Means for adjusting the Young's modulus and the rigidity of the contact material 10 for a thermal fuse include a method of creating a difference in thickness between the conductive base material 11 and the conductive member 12, a method of creating a difference by changing a degree of work hardening between the materials of the conductive base material 11 and the conductive member 12 by rolling/forging or the like, or by work hardening one of the conductive base material 11 and the conductive member 12, a method of creating a difference by changing the degree of heat treatment of quenching/annealing or the like between the materials of the conductive base material 11 and the conductive member 12 or by applying any of the heat treatments described above to only one of the materials of the conductive base material 11 and conductive member 12, and a method of increasing or decreasing the content of CuO, Ni, $SnO_2$, or $In_2O_3$ in the Ag alloy constituting the conductive member 12.

The movable contacts 20, 30 of example 2 of the present invention are illustrated in FIG. 2 and FIG. 3. The movable contacts 20, 30 are composed of the conductive base materials 21, 31 made of a Cu or Cu alloy that has a spring force, compresses readily, has favorable compression returnability, and a high Young's modulus and a high rigidity, and conductive members 22*a*, 22*b* and 32 made of Ag or Ag alloys having lower Young's moduli and rigidities than those of the conductive base materials 21, 31 in desired portions of the conductive base materials 21, 31, including the contact portions with the fixed contact and the cylindrical case. The conductive members 22*a*, 22*b*, and 32, while not particularly limited to this, may have electrical resistance values lower than those of the conductive base materials 21, 31.

Figure 5:
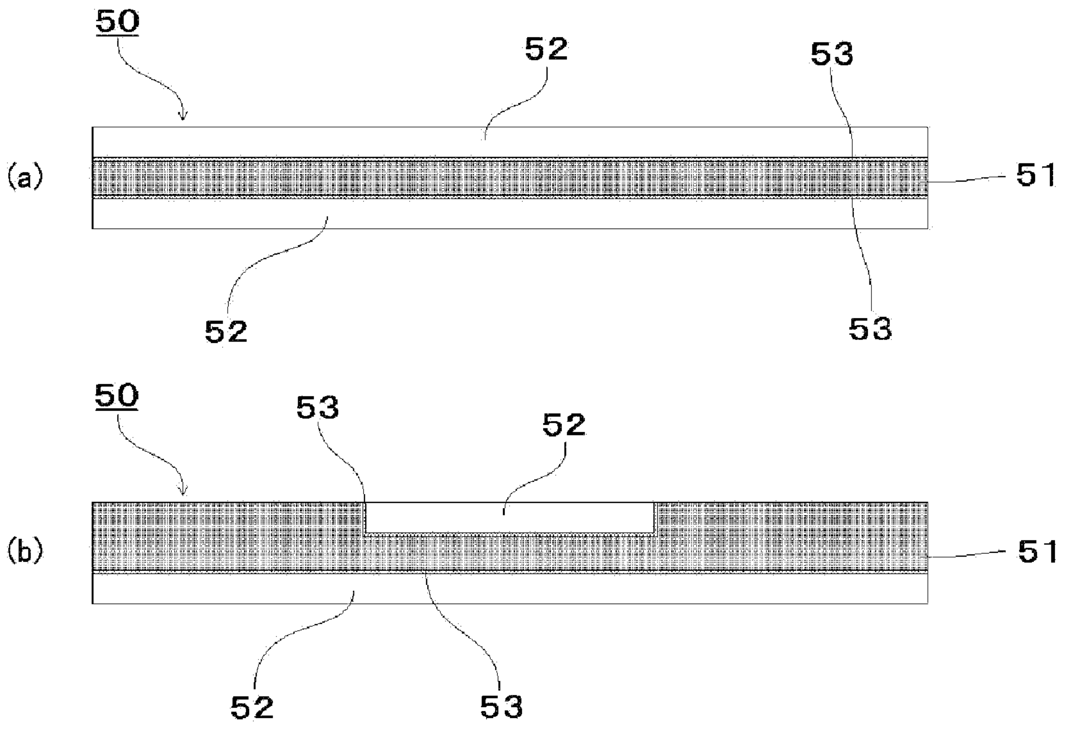
FIG. 5 illustrates an example of a cross-sectional view of a movable contact according to a modified example, FIG. 5(*a*) being a view obtained by leveling, into a flat plate, a cross-section taken along a line D-D in FIG. 2(*a*), and FIG. 5(*b*) being a view obtained by leveling, into a flat plate, a cross-section taken along a line d-d in FIG. 2(*a*).
Figure 6:
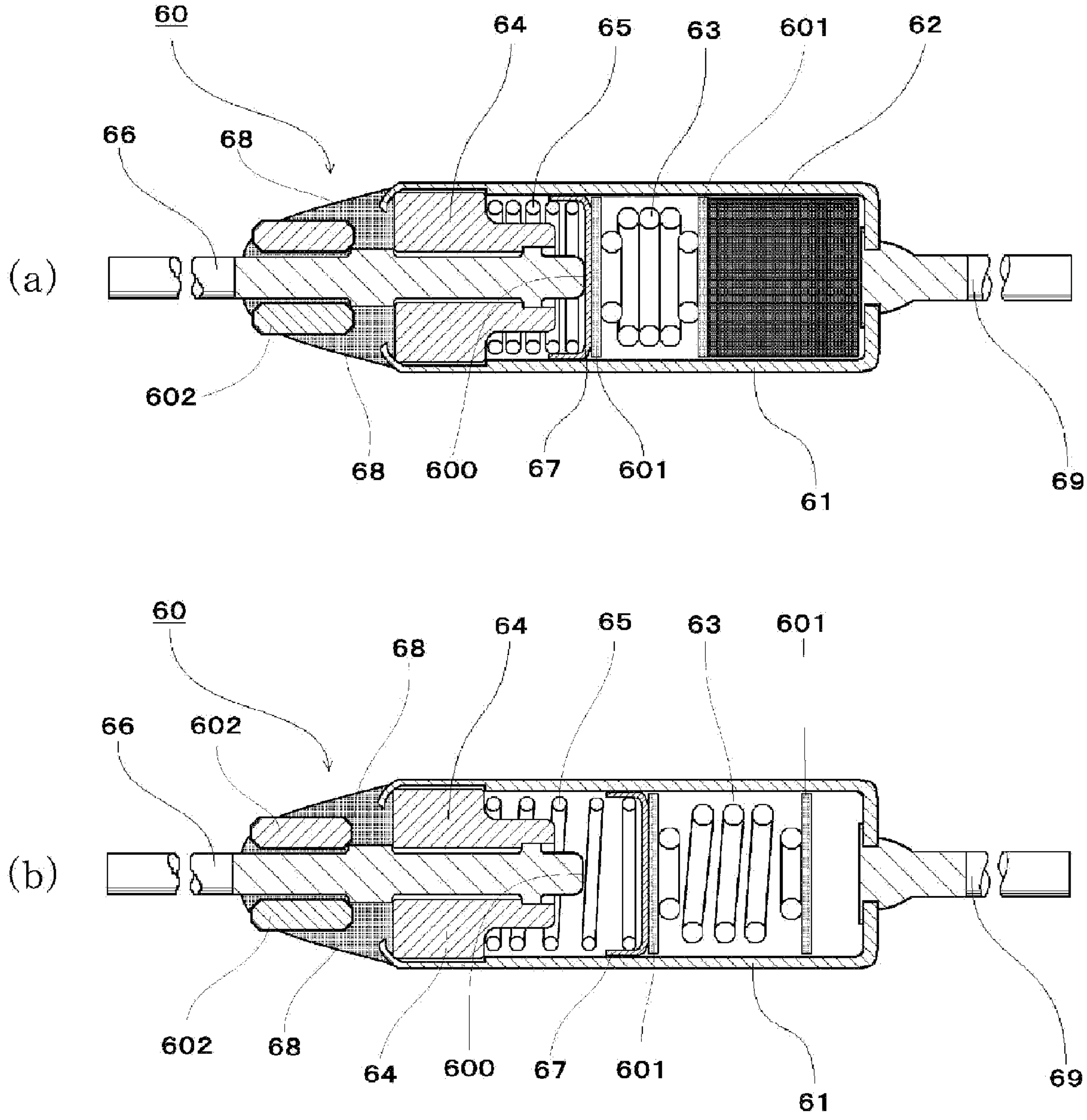
FIG. 6 is a cross-sectional view illustrating operation of the thermosensitive pellet-type thermal fuse according to the present invention, FIG. 6(*a*) illustrating a cross-sectional view of the thermosensitive pellet-type thermal fuse before operation, and FIG. 6(*b*) illustrating a cross-sectional view of the thermosensitive pellet-type thermal fuse after operation.

Movable contacts 20, 50 of example 3 of the present invention are illustrated in FIG. 2 and FIG. 5. The movable contacts 20, 50 are constituted by the conductive base materials 21, 51 made of a phosphor bronze selected from Cu or a Cu alloy that has spring force, compresses readily, has favorable compression returnability, and has a high Young's modulus and a high rigidity (Cu-8Sn-0.2P, Young's modulus: 110 [E/GPa], shear modulus: 43 [G/GPa], electrical resistance: 2.3 [μΩ·cm]) and the conductive members 22*a*, 22*b*, and 52 made of silver selected from Ag or a Ag alloy having a Young's modulus and a rigidity lower than those of the conductive base materials 21, 51 and an electrical resistance value lower than those of the conductive base materials 21, 51 in desired portions of the conductive base materials 21, 51, including the contact portions with the fixed contact and the cylindrical case (Young's modulus: 82.7 [E/GPa], shear modulus: 30.3 [G/GPa], electrical resistance: 1.47 [μΩ·cm]). Furthermore, as illustrated in FIG. 5, in an interface between the conductive base material 51 and the conductive member 52, the metal interface layer 53 composed of a Ni plating layer for prevention of interdiffusion and improvement of adhesion of both materials is provided. The movable contacts 20, 50 are composed of the conductive base material and the conductive member having Young's moduli and rigidities different from each other, and the conductive member, while not particularly limited to this, may have an electrical resistance value lower than that of the conductive base material.

The thermosensitive pellet-type thermal fuse 40 of FIG. 4 is illustrated as example 4 of the present invention. The thermosensitive pellet-type thermal fuse 40 includes, in the interior of the cylindrical case 41 having favorable electrical conductivity and favorable thermal conductivity, the thermosensitive pellet 42 that melts or softens at a specific temperature, the strong compression spring 43 configured to press the thermosensitive pellet 42, the insulating cover 44 closing the opening of the cylindrical case 41, the weak compression spring 45 abutting against the insulating cover 44, the first lead 46 extending through the insulating cover 44 and including the inner end as the fixed contact 400, the movable contact 47 electrically connecting to the first lead 46 and the cylindrical case 41, the sealing resin 48 provided surrounding a portion of the first lead 46 and covering the outer end portion of the insulating cover 44, and sealing the open end portion of the cylindrical case 41, and the second lead 49 disposed at one end of the cylindrical case 41. The movable contact 47 is constituted by the conductive base material made of a phosphor bronze selected from Cu or a Cu alloy that has spring force, compresses readily, has favorable compression returnability, and has a high Young's modulus and a high rigidity (Cu-8Sn-0.2P, Young's modulus: 110 [E/GPa], shear modulus: 43 [G/GPa], electrical resistance: 2.3 [μΩ·cm]) and the conductive member selected from Ag or a Ag alloy having a Young's modulus and a rigidity lower than those of the conductive base material and an electrical resistance value lower than that of the conductive base material, covering only the vicinity of the contact portions of this conductive base material with the fixed contact 400 and the cylindrical case 41 (Young's modulus: 82.7 [E/GPa], shear modulus: 30.3 [G/GPa], electrical resistance: 1.47 [μΩ·cm]). The conductive member made of a Ag alloy is selected from Ag alloys including any one of oxide metal alloys such as AgCuO, $AgSnO_2$, and $AgSnO_2$—$In_2O_3$ and Ag alloys such as AgNi. The movable contact 47 is composed of the conductive base material and the conductive member having Young's moduli and rigidities different from each other, and the conductive member, while not particularly limited to this, may have an electrical resistance value lower than that of the conductive base material. Means for adjusting the Young's modulus and the rigidity of the movable contact 47 include a method of creating a difference in thickness between the conductive base material and the conductive member, a method of creating a difference by changing a degree of work hardening between the materials of the conductive base material and the conductive member by rolling/forging or the like, or by work hardening one of the conductive base material and the conductive member, a method of creating a difference by changing the degree of heat treatment of quenching/annealing or the like between the materials of the conductive base material and the conductive member or by applying any of the heat treatments described above to only one of the materials of the conductive base material and conductive member, and a method of increasing or decreasing the content of CuO, Ni, $SnO_2$, and $In_2O_3$ in the Ag alloy constituting the conductive member.

Figure 7:
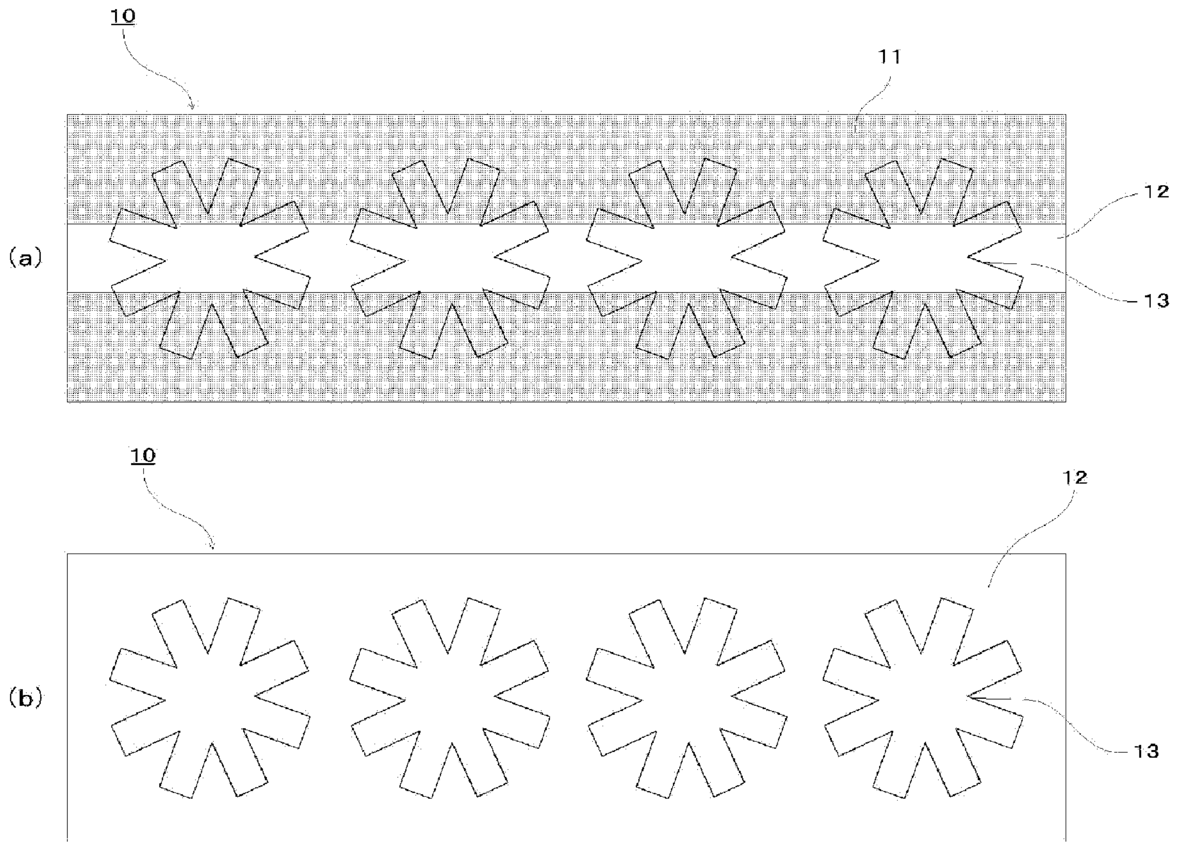
FIG. 7 is a diagram illustrating a modified example of the punching locations of a movable contacts in the contact material 10 according to the present invention, FIG. 7(*a*) being a diagram illustrating a modified example of the punching locations on the surface of the side of the movable contacts that includes the contact portion with the fixed contact, and FIG. 7(*b*) being a diagram illustrating a modified example of the punching locations on the surface of the side of the movable contacts that includes the contact portion with the cylindrical case.

FIG. 7 is a diagram illustrating a modified example of the punching locations of the movable contacts in the contact material 10 according to the present invention. FIG. 7(*a*) is a diagram illustrating a modified example of the punching locations on the surface of the side of the movable contacts that includes the contact portion with the fixed contact, and FIG. 7(*b*) is a diagram illustrating a modified example of the punching locations on the surface of the side of the movable contacts that includes the contact portion with the cylindrical case. In this way, the punching locations 13 of the movable contact in the contact material 10 need only be disposed and formed so that the conductive member 12 of the movable contact at least corresponds to the contact portions with the fixed contact and the cylindrical case of the thermosensitive pellet-type thermal fuse, and thus comes into contact with the fixed contact and the cylindrical case.

INDUSTRIAL APPLICABILITY

The present invention can be suitably utilized for a temperature protection element including a contact, such as a contact separation-type thermal fuse for high current or a bi-metal-type protection element including a movable contact and configured to separate the contact upon detection of an abnormal temperature, and can be particularly suitably utilized for a thermosensitive pellet-type thermal fuse.

REFERENCE SIGNS LIST

10 Contact material for thermal fuse
11 Conductive base material
12 Conductive member
13 Punching location of movable contact
20 Movable contact
21 Conductive base material
22*a*, 22*b* Conductive member
30 Movable contact
31 Conductive base material
32 Conductive member
40 Thermosensitive pellet-type thermal fuse
41 Cylindrical case
42 Thermosensitive pellet
43 Strong compression spring
44 Insulating cover
45 Weak compression spring
46 First lead
47 Movable contact
48 Sealing resin
49 Second lead
400 Fixed contact
401 Pressing plate
402 Insulating porcelain tube
50 Movable contact
51 Conductive base material
52 Conductive member
53 Metal interface layer
60 Thermosensitive pellet-type thermal fuse
61 Cylindrical case
62 Thermosensitive pellet
63 Strong compression spring
64 Insulating cover
65 Weak compression spring
600 Fixed contact
66 First lead
67 Movable contact
68 Sealing resin
69 Second lead
601 Pressing plate
602 Insulating porcelain tube

The invention claimed is:

1. A contact material for a thermal fuse, the contact material comprising:

a conductive base material provided in a cylindrical case of the thermal fuse so as to contact to both an inner wall surface of the cylindrical case and a fixed contact of the thermal fuse, and the conductive base material is bowl shape and has an outer side surface facing to the cylindrical case and an inner side surface facing to the fixed contact; and a conductive member provided covering a surface of the conductive base material, wherein the conductive member is provided to only partially cover one of or both of the outer side surface and the inner side surface, by providing to at least contact portions with the fixed contact in the inner surface and the cylindrical case in the outer surface, wherein at least one of the inner side surface and the outer side surface has at least one region which is free from the conductive member and wherein the conductive member is made of a material having a Young's modulus and a rigidity different from a Young's modulus and a rigidity of the conductive base material.

2. The contact material for a thermal fuse according to claim 1, wherein the conductive member is provided by an overlay or an inlay to the contact portions of the cylindrical case or the contact portion of the fixed contact.

3. The contact material for a thermal fuse according to claim 1, wherein the conductive base material is Cu or a Cu alloy.

4. The contact material for a thermal fuse according to claim 1, wherein the conductive member is Ag or a Ag alloy.

5. The contact material for a thermal fuse according to claim 4, wherein the Ag alloy is selected from AgCuO, AgSnO2, AgSnO2-In2O3, or AgNi.

6. The contact material for a thermal fuse according to claim 1, wherein a metal interface layer composed of a Ag plating layer, a Ni plating layer, a Ni—P alloy plating layer, and an alloy plating layer with Ni as a main component is provided at an interface between the conductive base material and the conductive member.

7. The contact material for a thermal fuse according to claim 1 wherein the conductive base material is made of a material that has a greater spring force, compresses more readily, has more favorable compression returnability, and has a higher Young's modulus and a higher rigidity than the conductive member.

8. The contact material for a thermal fuse according to claim 1, wherein the conductive member is made of a material having a lower Young's modulus and a lower rigidity than the conductive base material.

9. The contact material for a thermal fuse according claim 8, wherein the conductive member is made of a material further having a lower electrical resistance than the conductive base material.

10. A movable contact comprising:

a conductive base material provided in a cylindrical case of the thermal fuse so as to contact to both an inner wall surface of the cylindrical case and a fixed contact of the thermal fuse, and the conductive base material is bowl shape and has an outer side surface facing to the cylindrical case and an inner side surface facing to the fixed contact; and a conductive member provided covering a surface of the conductive base material, wherein the conductive member is provided to only partially cover one of or both of the outer side surface and the inner side surface, by providing to at least contact portions with the fixed contact in the inner surface and the cylindrical case in the outer surface, wherein at least one of the inner side surface and the outer side surface has at least one region which is free from the conductive member, and wherein the conductive member is made of a material having a Young's modulus and a rigidity different from a Young's modulus and a rigidity of the conductive base material.

11. The movable contact according to claim 10, wherein the conductive member is provided by an overlay or an inlay to the contact portions of the cylindrical case or the contact portion of the fixed contact.

12. The movable contact according to claim 10, wherein the conductive base material is Cu or a Cu alloy.

13. The movable contact according to claim 10, wherein the conductive member is Ag or a Ag alloy.

14. The movable contact according to claim 13, wherein the Ag alloy is selected from AgCuO, AgSnO2, AgSnO2-In2O3, or AgNi.

15. The movable contact according to claim 10, wherein a metal interface layer composed of a Ag plating layer, a Ni plating layer, a Ni—P alloy plating layer, and an alloy plating layer with Ni as a main component is provided at an interface between the conductive base material and the conductive member.

16. The movable contact according to claim 10, wherein the conductive base material is made of a material that has a greater spring force, compresses more readily, has more favorable compression returnability, and has a higher Young's modulus and a higher rigidity than the conductive member.

17. The movable contact according to claim 10, wherein the conductive member is made of a material having a lower Young's modulus and a lower rigidity than the conductive base material.

18. The movable contact according claim 17, wherein the conductive member is made of a material further having a lower electrical resistance than the conductive base material.

19. A thermosensitive pellet-type thermal fuse comprising:

a cylindrical case having favorable electrical conductivity and favorable thermal conductivity, a thermosensitive pellet that melts or softens at a specific temperature provided to inside of the cylindrical case;

a strong compression spring configured to press the thermosensitive pellet;

an insulating cover closing an opening of the cylindrical case;

a weak compression spring abutting against the insulating cover;

a first lead extending through the insulating cover and including an inner end as a fixed contact;

a movable contact electrically connecting to each of a fixed contact of the first lead and an inner surface of the cylindrical case;

a sealing resin provided surrounding a portion of the first lead and covering an outer end portion of the insulating cover, and sealing an open end portion of the cylindrical case; and a second lead disposed at one end of the cylindrical case, wherein the movable contact includes a conductive base material in a bowl shape having an outer side surface facing to the cylindrical case and an inner side surface facing to the fixed contact and a conductive member covering the conductive base material, and the conductive member is provided to only partially cover one of or both of the outer side surface and the inner side surface, by providing to at least contact portions with the fixed contact in the inner surface and the cylindrical case in the outer surface, wherein at least one of the inner side surface and the outer side surface has at least one region which is free from the conductive member, and wherein the conductive member is made of a material having a Young's modulus and a rigidity different from a Young's modulus and a rigidity of the conductive base material.

20. The thermosensitive pellet-type thermal fuse according to claim 19, wherein the conductive member is provided by an overlay or an inlay to the contact portions of the cylindrical case or the contact portion of the fixed contact.

21. The thermosensitive pellet-type thermal fuse according to claim 19, wherein the conductive base material is Cu or a Cu alloy.

22. The thermosensitive pellet-type thermal fuse according to claim 19, wherein the conductive member is Ag or a Ag alloy.

23. The thermosensitive pellet-type thermal fuse according to claim 22, wherein the Ag alloy is selected from AgCuO, AgSnO2, AgSnO2-In2O3, or AgNi.

24. The thermosensitive pellet-type thermal fuse according to claim 19, wherein a metal interface layer composed of a Ag plating layer, a Ni plating layer, a Ni—P alloy plating layer, and an alloy plating layer with Ni as a main component is provided at an interface between the conductive base material and the conductive member.

25. The thermosensitive pellet-type thermal fuse according to claim 19, wherein the conductive base material is made of a material that has a greater spring force, compresses more readily, has more favorable compression returnability, and has a higher Young's modulus and a higher rigidity than the conductive member.

26. The thermosensitive pellet-type thermal fuse according to claim 19, wherein the conductive member is made of a material having a lower Young's modulus and a lower rigidity than the conductive base material.

27. The thermosensitive pellet-type thermal fuse according claim 26, wherein the conductive member is made of a material further having a lower electrical resistance than the conductive base material.

* * * * *